Feb. 27, 1968  J. W. PRICE, JR  3,370,769
APPARATUS FOR MAKING PARQUET FLOORING TILES
Filed July 13, 1965  3 Sheets-Sheet 2

INVENTOR.
JOHN W. PRICE, JR.
BY Kimmel, Crowell & Weaver
ATTORNEYS.

Feb. 27, 1968    J. W. PRICE, JR    3,370,769
APPARATUS FOR MAKING PARQUET FLOORING TILES
Filed July 13, 1965    3 Sheets-Sheet 3
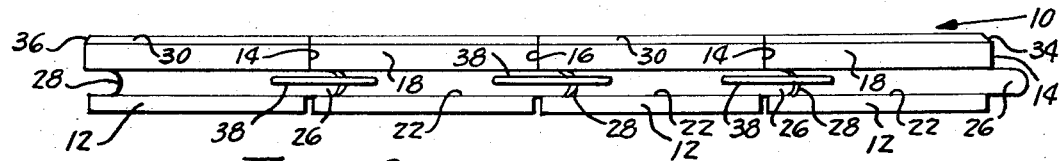
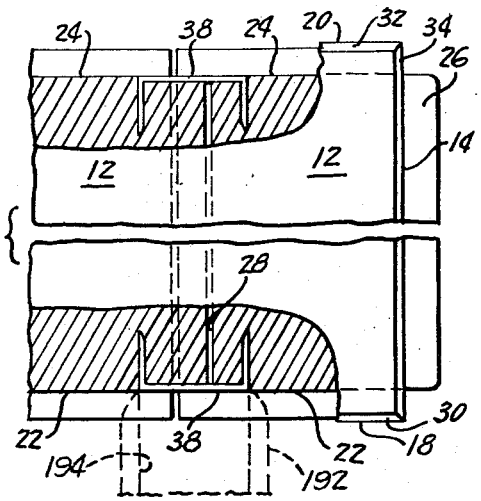
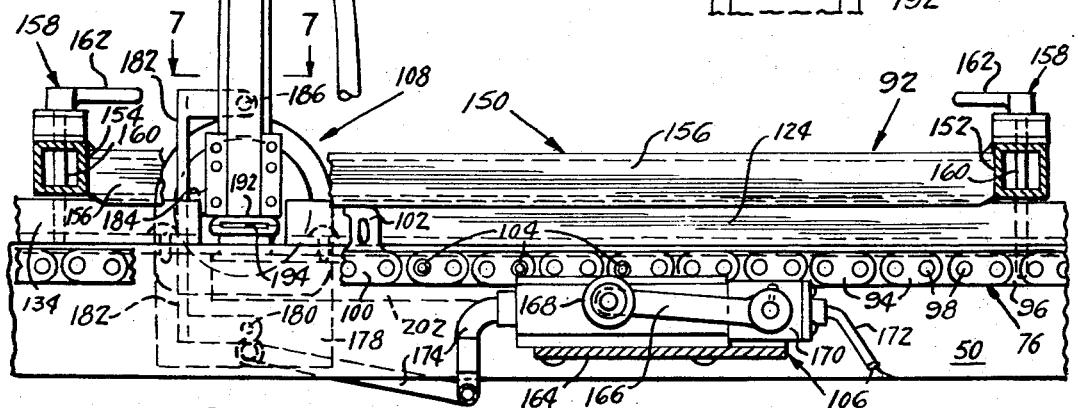
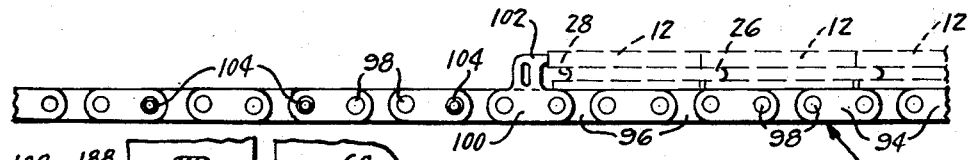
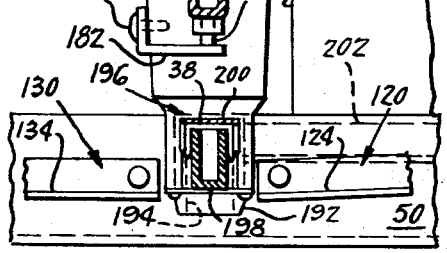
INVENTOR.
JOHN W. PRICE, JR.
BY Kimmel, Crowell & Weaver
ATTORNEYS.

United States Patent Office 3,370,769
Patented Feb. 27, 1968

3,370,769
APPARATUS FOR MAKING PARQUET
FLOORING TILES
John William Price, Jr., Madison, Va., assignor to Madison
Flooring Company, Inc., Madison, Va.
Filed July 13, 1965, Ser. No. 471,549
12 Claims. (Cl. 227—3)

This invention relates to the preassembly of parquet flooring tiles and more particularly to a means and method for assembling parquet slats into a convenient form for packaging, sale and use.

Parquet flooring is a conventional and well known type of flooring and comprises a plurality of substantially rectangular wooden slats that are secured to a subflooring by glue, mastic, asphaltic tar or the like. In the past, parquet flooring tiles have been constructed by juxtaposing a series of wooden slats and securing them together from the bottom by a plurality of corrugated nails. Such flooring tiles are customarily equipped with one or more tongues on the lateral edges of the tile and one or more tongue-receiving grooves on the opposite lateral edges. The assembly of a parquet floor customarily consists of the application of a glue-like material to a subfloor and the positioning of parquet flooring tiles on the subflooring such that the tongues of one tile are received by the grooves of an adjacent tile.

There are many difficulties residing in the construction and use of presently available parquet flooring tiles, among which are the inherent rigidity of a tile secured together by corrugated nails, the susceptibility of such a tile to the adverse affects of absorbed moisture, and the inability to deform slightly a tile so constructed to conform to a minutely undulating subflooring or to fit within a slightly skewed corner.

More specifically, the absorption of moisture by wooden slats results in an expansion across the grain thereof which tends to loosen or totally destroy the corrugated nail connection. Since a corrugated nail construction is so rigid, water absorption often results in a splitting or breaking of such a tile.

It is a primary object of this invention to provide a parquet flooring tile having a plurality of wooden slats secured side-by-side such that a slight amount of movement is possible between adjacent slats.

A further object of this invention is to provide a method and means for manufacturing such a flooring tile.

A further object of the instant invention is to provide a method and apparatus for stapling together preformed wooden slats to construct a parquet flooring tile.

A more specific object of this invention is to provide a method and means for aligning a plurality of preformed wooden slats having grooves provided on opposite lateral edges.

Another more specific object of the instant invention is to provide a pair of opposed stapling means controlled to deliver staples on the lateral edges of aligned wooden slats to secure adjacent slats together.

A still further object of the instant invention is to provide a control means for stapling guns in order to insure the delivery of staples at the junction of aligned wooden slats.

Other objects and advantages of the instant invention reside in the combinations of elements and manipulative steps, arrangements of elements and manipulative steps, and features of construction and operation, all as will be more fully pointed out hereinafter and disclosed in the accompanying drawings wherein there is shown a preferred embodiment of this invention concept.

In the drawings:

FIGURE 5 is a view substantially in longitudinal cross-section taken along line 5—5 of FIGURE 1, viewing in the direction of the arrows, and showing a control means for actuating a plurality of stapler guns at the correct instant;

FIGURE 6 is an enlarged view of the conveyor chain of the apparatus of FIGURE 1 showing the movement of a plurality of preformed wooden slats by an upstanding lug;

FIGURE 7 is a cross-sectional view taken along line 7—7 of FIGURE 5 and showing a top view of the stapler guns;

Figure 1:
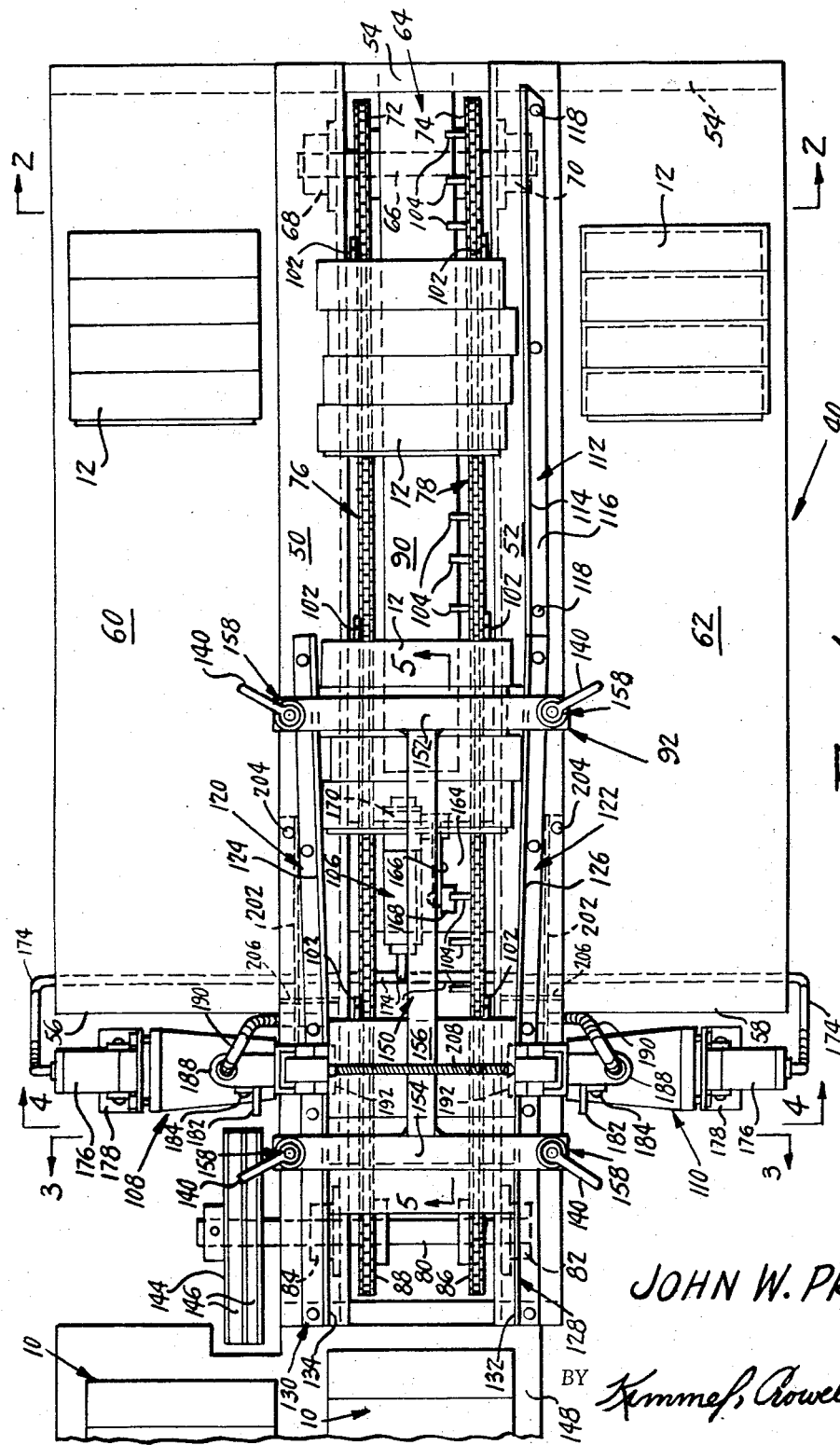
FIGURE 1 is a top plan view of an apparatus constructed in accordance with the principles of the instant invention for assembling a plurality of preformed wooden slats in a parquet flooring tile.

FIGURE 8 is a side elevational view of a completed parquet flooring tile showing the interconnection of a plurality of preformed wooden slats; and FIGURE 9 is a top plan view of a parquet flooring tile, certain parts being broken away for clarity of illustration, and showing in dotted line position the location of the stapler head immediately after a staple is delivered into the preformed wooden slats.

For purposes of clarity, the parquet flooring tile produced by the instant invention will be first described followed by a description of the method and apparatus by which this product is manufactured. A finished parquet flooring tile is shown generally at 10 in FIGURES 8 and 9 and includes a plurality of substantially identical rectangular wooden slats of oak, maple, mahogany, teak, walnut, or any other suitable hard wood, composition or artificial flooring material, although oak is preferred. Each of wooden slats 12 has a first long edge 14, a second long edge 16 parallel to edge 14, a first short edge 18 perpendicular to to edges 16, 18 and a second short edge 20 parallel to edge 18. Each of short edges 18, 20 are formed with a slot 22, 24, the center of which is spaced below the center plane of slat 12 with slots 22, 24 being substantially aligned.

A tongue 26 extends through a substantial linear distance of first edge 14 and is formed integral therewith substantially aligned with slots 22, 24 and is complementarily configured to fit within similarly shaped slots. Second long edge 16 is formed with a groove 28 substantially aligned with slots 22, 24 and is configured to receive tongue 26. Short edges 18, 20 may be formed on the upper edge thereof, as at 30, 32 to provide a decorative border with leading and trailing slats 12 having edges 14, 16 being similarly formed, as at 34, 36.

The portion of slat 12 beneath grooves 22, 24, 28 and beneath tongue 26 as shown in FIGURE 8 is of slightly lesser extent than that portion of slat 12 above grooves 22, 24, 28 and above tongue 26. This slightly indented feature allows for the convenient nestling of tongues 26 in grooves 28 and also allows a slight flexing of parquet flooring tile 10 to accommodate moisture induced swelling or to fit upon a slightly undulating floor.

When slats 12 are nestled together as shown in FIGURE 8, slots 22 will form a substantially continuous groove throughout the extent of flooring tile 10 as will slots 24 on the hidden side of flooring tile 10 in FIGURE 8. As more fully explained hereinafter, this provides a guide means for a stapler head so that a staple 38 may be emplaced therein to secure one wooden slat 12 to an adjacent slat. It will be seen that slats 12, even though they are stapled together as shown in FIGURE 8, may move slightly relative to each other because of the inherent pivotal characteristics of groove 28, tongue 26 and the lesser extent of that portion of slat 12 beneath grooves 22.

Referring now to the remainder of the drawings, wherein like reference characters designate like elements throughout the several views thereof and in which the reference characters of parquet flooring tile 10 are often used to describe the operation of the instant invention, there is indicated generally at 40 a device for manufacturing parquet flooring tiles 10 comprising a pair of substantially vertical parallel spaced apart angle iron frame members 42, 44 to which are secured by a plurality of rivets 46, 48 a pair of horizontal parallel spaced apart angle iron members 50, 52. A first transverse angle iron frame member 54 is secured to the ends of frame members 50, 52 and along with a second and third transverse angle iron frame member 56, 58, forms a supporting means for a pair of horizontal working surfaces 60, 62 from which may be placed a plurality of preformed wooden slats 12 which may be made by any suitable wood forming machine.

Positioned between horizontal working surfaces 60, 62 is a conveying means shown generally at 64 including a first rotatable shaft 66 rotatably mounted in vertical frame members 42, 44 by a pair of suitable bearings 68, 70. A pair of spaced apart sprockets 72, 74 are keyed to shaft 66 for rotation therewith and have wound about the periphery thereof a pair of sprocket chains shown generally at 76, 78. A second rotatable shaft 80 is mounted between vertical frame members 42, 44 at the other end of device 40 by suitable journals 82, 84. Shaft 80 fixedly carries a pair of sprockets 86, 88 in alignment with sprockets 72, 74, as may be seen in FIGURE 1, and about which are mounted sprocket chains 76, 78. Suitable idler sprockets (not shown) may be mounted between rotatable shafts 66, 80 in a known manner.

Figure 2:
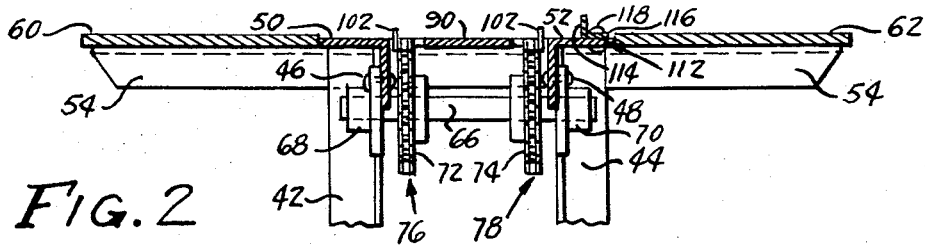
FIGURE 2 is a transverse cross-sectional view of the apparatus of FIGURE 1 taken along line 2—2 thereof, viewing in the direction of the arrows, and showing the material inlet of the instant apparatus.

Positioned between sprocket chains 76, 78 and providing an input to conveyor 64 is a supporting plate 90 extending from angle iron member 54, coplanar with the upper surfaces of conveyor chains 76, 78, to a position underlying a holding means shown generally at 92 to be more fully explained hereinafter. As shown in FIGURES 2 through 6 inclusive, each of sprocket chains 76, 78 includes a plurality of links 94, 96 secured together by conventional chain pins 98. Chains 76, 78 also include a plurality of transversely aligned pusher links 100 having an upstanding pusher member 102 extending above the plane formed by angle members 50, 52 and plate 90 as shown in FIGURE 2.

It will be seen that when a plurality of preformed wooden slats 12 are placed on the input edge of plate 90 transverse with respect to the movement of conveyor 64, a plurality of slats will be moved along conveyor 64 together. Sprocket chain 78 has provided thereon a number of actuating cam means 104 which, as illustrated, constitute three camming members in each series that actuate a control device shown generally at 106 to selectively operate one or both of a pair of stapling means shown generally at 108, 110.

A first alignment member shown generally at 112 constitutes an angle iron member having a vertical leg 114 and a horizontal leg 116 secured to frame member 52 by any conventional means, such as by rivets 118, such that vertical leg 114 is substantially parallel to conveyor chains 76, 78. A second and third alignment member shown generally at 120, 122 form a converging trough with each alignment member constituting a piece of angle iron having a vertical leg 124, 126. A pair of parallel guide means shown generally at 128, 130 are in material transferring relation with respect to second and third alignment members 120, 122, as may be seen in FIGURE 7 but are spaced apart to accommodate the head of stapler 108. Parallel guide means 128, 130 include similar angle iron pieces having vertical edges 132, 134 which are substantially parallel for guiding a parquet flooring tile after the stapling step has been completed.

Figure 3:
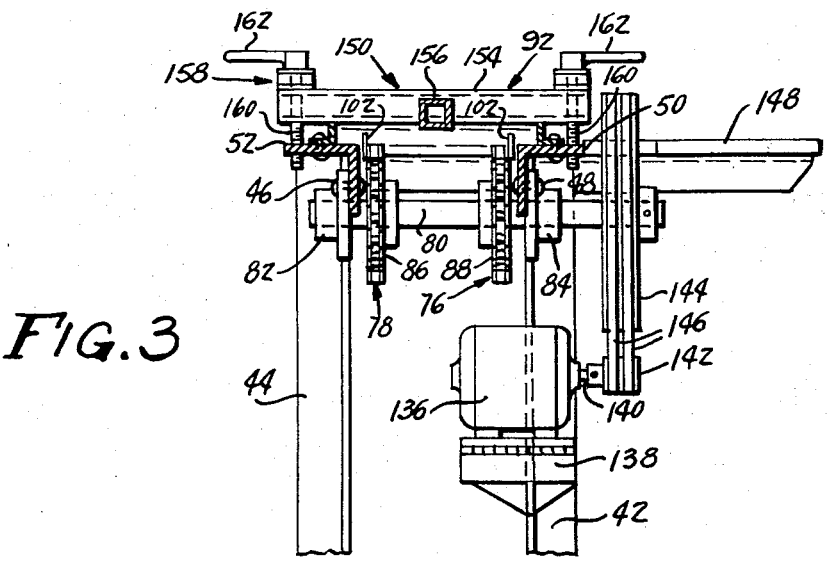
FIGURE 3 is a transverse cross-sectional view of the apparatus of FIGURE 1 taken along line 3—3 thereof and viewing in the direction of the arrows.

Sprocket chains 76, 78 may be driven by any suitable means, but are preferably powered by an electric motor 136 mounted on frame member 42 by a suitable bracket 138 as may be seen in FIGURE 3. Motor 136 includes a drive shaft 140 having a driving pulley 142 secured on the outer end thereof with shaft 80 carrying a driven pulley 144. A plurality of rubber drive belts 146 are wrapped about the peripheries of driving and driven pulleys 142, 144 to drive shaft 80 in a conventional manner. Bracket 138 is preferably slidably mounted on vertical frame member 42 to provide a means for adjusting the tension of belts 146.

In the operation of conveyor means 64, electric motor 136 will be activated thereby rotating conveyor drive shaft 80 and causing the translation of conveyor chains 76, 78. A number of preformed wooden slats 12 will be placed on plate 90 at the input end of device 40 as may be seen in FIGURE 1. The movement of sprocket chains 76, 78 will result in the movement of wooden slats 12 as a unit because of contact between pusher members 102 and slats 12 as may be seen in FIGURES 1 and 6. Since preformed slats 12 are provided with mating tongues and grooves 26, 28, slats 12 will nestle together as shown in FIGURE 6. As slats 12 are moved between converging alignment means 120, 122, vertical edges 124, 126 will cooperate to align lateral edges 18, 20 of slats 12 in a straight line.

As slats 12 approach stapling guns 108, 110, camming means 104 carried by conveyor chain 78 will actuate control means 106 such that staplers 108, 110 deliver a staple 38 into aligned slots 22 of wooden slats 12 as shown in FIGURE 8. Thus slats 12 are formed together into a parquet flooring tile 10 which travels between guide means 128, 130 to a convenient loading station 148.

Guide means 92 includes an I-shaped member shown generally at 150 including first and second transverse bars 152, 154 and a longitudinal bar 156 secured therebetween. The outer ends of trasverse bars 152, 154 are vertically adjustably mounted by a plurality of substantially identical elevating screws indicated generally at 158. Elevating screws 158 include a vertical threaded screw 160 threadably received in angle iron members 50, 52 operably connected to a rotatable handle 162 which may be rotated to raise or lower I-shaped member 150 in a known manner. It should be apparent that the interior connection of handle 162 and threaded member 160 is such that I-shaped member 150 will move upwardly and downwardly in accordance with the rotation of handle 162. It should be seen that I-shaped member 150 is customarily placed closely adjacent guide means 120, 122, 128, 130 to vertically position slats 12 at an appropriate position and to prevent slats 12 from upward movement during a stapling operation.

Control means 106, which acts to selectively operate staplers 108, 110 is mounted between frame members 50, 52 by a suitable brackets 164 and constitutes an electrical microswitch having an upwardly biased arm 166 carrying a cylindrical camming surface 168 which is moved downwardly by camming pins 104 as may be seen in FIGURE 5. Actuating arm 166 is pivotally mounted in a switch housing 170 in which is mounted a conventional microswitch (not shown) connected by an electrical connection 172 to a conventional power source.

When pivotable arm 166 is moved downwardly by the coaction of camming surfaces 104, 168, an electrical circuit is completed between a power source, switch 106, and a conventional electrical circuit 174 leading to a pair of electrical solenoids 176 associated with each of staplers 108, 110. Solenoids 176 are mounted by an L-shaped bracket 178 onto the rear of staplers 108, 110 and are connected by an adjustable rod 180 to a trigger 182 pivotally mounted by a pin 184 on each of staplers 108, 110. The upper end of trigger 182 is closely adjacent a pneumatic actuating button 186 which opens and closes a conventional valve residing in housing 188 of staplers 108, 110. Housing 188 is connected by a pneumatic conduit 190 to a conventional source of compressed air (not shown) thus providing a motive power by which staplers 108, 110 may be actuated.

Figure 4:
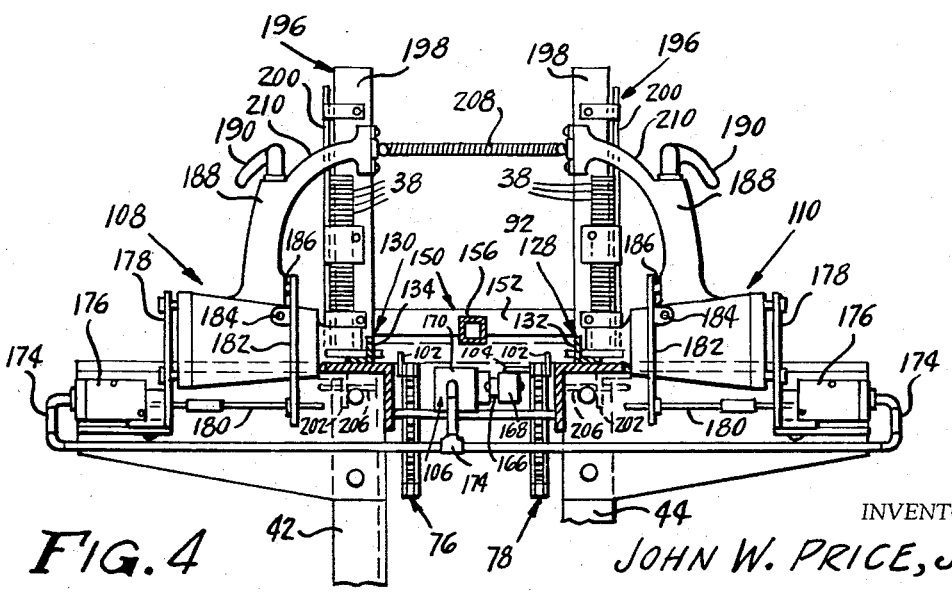
FIGURE 4 is another transverse cross-sectional view of the apparatus of FIGURE 1 taken along line 4—4 thereof and viewing in the direction of the arrows.

It should be apparent that the downward camming of arm 166 completes an electrical circuit from a power source through conduit 172, switch 106, and electrical conduit 174 to actuate solenoid 176. The actuation of solenoid 176 moves rod 180 toward the center of device 40 thus pivoting trigger 182 of stapler 108, as seen in FIGURE 4, in a counterclockwise direction thus depressing actuating button 186. The movement of actuating button 186 delivers compressed air into the interior of stapler 108 and delivers staple 38 into adjacent wooden slats 12.

Each of staplers 108, 110 is provided with a stapling head 192 having a staple dispensing slot 194 therein, with head 192 extending toward the center of conveyor 64 and extending beyond guide means 120, 122, 128, 130 as may be seen in FIGURE 1. Since wooden slats 12 are provided with a longitudinally extending pair of grooves 22, 24, extending along lateral edges 18, 20, stapler head 192 is slidably received thereby to deliver staples 38 interior of the extreme lateral edges of slats 12. Accordingly, staples 38 are positioned within slots 22, 24 and do not interfere with the subsequent laying, in the conventional manner, of parquet flooring tile 10.

It should be noted that one of staplers 108, 110 may be rendered inoperative thus delivering staples 38 to only one side of wooden slats 12. It is feasible and may be desirable under certain circumstances, to secure slats 12 together on one side by staples and on the other side by adhesive tape or the like positioned within slots 22, 24.

Each of staplers 108, 110 is provided with a conventional staple feeding device shown generally at 196 including a first narrow U-shaped member 198 receiving staples 38 on the outer periphery thereof, as seen in FIGURE 7 and a closely adjacent second U-shaped upstanding member 200 receiving staples 38 along the inner periphery thereof. It should be apparent that a driving hammer within staplers 108, 110 will drive a single staple from between U-shaped members 198, 200 into and through staple dispensing slot 194 of stapler head 192.

Although staplers 108, 110 may be fixedly secured, as to transverse angle iron members 56, 58, it has been found very advantageous to movably mount staplers 108, 110 on frame members 50, 52 to accommodate the recoil of staplers 108, 110 and to effect a tight engagement between stapler heads 192 and slots 22, 24 of slats 10. This movable mounting may be affected by providing a stapler support bar 202 beneath frame members 50, 52 and securing it thereto by a pair of pivot pins 204. Staplers 108, 110 are fixedly secured to the free ends of support bars 202 and are biased inwardly to the center of device 40 by a pair of pins 206, secured to frame members 50, 52, carrying a spring thereon.

Completing the biasing of staplers 108, 110 to the center of device 40 is a spring 208 connected to an arm 210 on each of staplers 108, 110. It will be seen that stapler heads 192 will be biased toward the center of device 40 and conveyor 64 and, when stapler head 192 is received in groove 22 of preformed wooden slats 12, staplers 108, 110 will be biased outwardly slightly to ensure a tight connection between slats 12 and stapler head 192 at the time that staple 38 is dispensed therefrom.

Although it is believed that a sufficient understanding of the operation of this device may be gained from the previous discussion, a step by step explanation is believed in order. A number of preformed wooden slats 12 are placed on plate 90 as shown in the uppermost part of FIGURE 1 either by workmen or by some suitable automatic device. Although it is shown that four separate slats 12 are secured together to form parquet flooring tile 10, it should be understood that any desired number may be secured together.

Conveyor 64 will transport slats 12 toward guide means 92 at which time alignment means 120, 122 will begin the necessary alignment of slats 12 with bar 156 of guide means 92 precluding the upward movement of slats 12.

As a plurality of slats 12 approach the stapling or securing position, slots 22, 24 on lateral edges 18, 20 of slat 12 will receive stapling head 192 of staplers 108, 110. This will cause the outward pivotal movement of staplers 108, 110 and cause trailing slats 12 to be firmly engaged with the preceding slat.

When the junction of the first two slats is positioned adjacent stapler dispensing slot 194, camming bar 104 will contact camming surface 168 and actuate control means 106. As previously mentioned, control means 106 will activate solenoid 176 to deliver compressed air into the interior of staplers 108, 110 and forcibly deliver a staple 38 within slots 22, 24 between adjacent slats 12.

As the junction of each pair of slats 12 approaches stapler head 192, a subsequent camming pin 104 will actuate control means 106 thus stapling each pair of adjacent slats together. It should be seen that the pivotal spring biasing mounting of staplers 108, 110 will absorb a considerable amount of the recoil produced by the forcible delivery of staples.

The parquet flooring tiles produced by the operation of device 40 may have many desirable characteristics. One such characteristic is that tiles 10 are slightly flexible in that each of adjacent slats 12 may pivot slightly with respect to an adjacent slat. Generally, parquet flooring tiles are packaged in a moisture-proof container in the hope of precluding the absorption of moisture by the wooden tile. This has not been altogether successful in practice and has resulted in the warping or splitting of previously available flooring tiles. Since the use of staples along the lateral edge of a tile allows some relative movement between the slats that make up the tile, moisture absorption has not detrimentally affected tiles made by the instant device and method.

It is thus seen that there is herein provided an improved method and means for making parquet flooring tiles as well as improved parquet flooring tiles, having all of the advantages of the instant invention and others, including many advantages of great practical utility and commercial importance.

Since many embodiments may be made of the instant inventive concepts, and since many modifications may be made in the embodiments hereinbefore shown and described, it is to be understood that the foregoing is to be interpreted merely as illustrative and not in a limiting sense.

I claim:

1. A device for assembling parquet flooring tiles comprising conveyor means for delivering in a predetermined path a plurality of substantially planar juxtaposed preformed wooden slats having edges substantially parallel to the direction of travel of said conveyor means from an input station to a securing station and frictional fastener driving means positioned at said securing station straddling said conveyor means for forcibly delivering frictional fasteners at preselected times into said edges of at least two juxtaposed wooden slats.

2. A device for assembling parquet flooring tiles comprising conveyor means for delivering in a predetermined path a plurality of substantially identical planar juxtaposed wooden slats having edges substantially parallel to said predetermined path from an input station to a securing station, means for aligning said edges of said wooden slats, and frictional fastener driving means positioned at said securing station on each side of said conveyor means for forcibly delivering frictional fasteners at preselected times into said edges of at least two juxtaposed wooden slats.

3. A device for assembling parquet flooring tiles comprising conveyor means for delivering in a predetermined path a plurality of substantially identical planar juxtaposed wooden slats having edges substantially parallel to said predetermined path from an input station to a securing station, means for aligning said edges of said wooden slats, and fastener applying means positioned at said securing station applying discrete fasteners at preselected times to said edges of at least two juxtaposed wooden slats.

4. A device for assembling parquet flooring tiles comprising conveyor means for delivering in a predetermined path a plurality of substantially identical planar juxtaposed wooden slats having edges substantially parallel to said predetermined path from an input station to a securing station, means for aligning said edges of said wooden slats, and stapling means having a staple dispensing slot positioned at said securing station on one side of said conveying means for forcibly delivering at least one staple at preselected times into said edges of at least two juxtaposed wooden slats.

5. The structure of claim 4 including control means operatively engaged with said stapling means for sensing the condition when two juxtaposed wooden slats are located adjacent said staple dispensing slot and actuating said stapling means.

6. The structure of claim 5 including guide means mounted on said device above said conveyor means along said predetermined path including said securing station for precluding movement of said wooden slats away from said conveyor means.

7. The structure of claim 6 wherein said edges of said preformed wooden slats include a slot, said stapling means includes a staple dispensing head surrounding said staple dispensing slot extending into said predetermined path, and means movably mounting said stapling means on said device having means biasing said stapling means toward said conveyor means.

8. The structure of claim 4 wherein said conveyor means includes at least one endless member carrying a series of cam means positioned along said endless member and providing a pusher means located on said endless member between said cam means and said securing station for engaging said wooden slats, said control means includes an arm having cam means and means movably mounting said arm in a predetermined path and positioning said cam means of said arm adjacent said endless member for periodically engaging said cam means of said endless member whereby said arm is periodically moved in said predetermined path, said control means including means for translating the movement of said arm into a signal for actuating said stapling means.

9. The structure of claim 8 wherein said stapling means includes an actuating button and means for periodically depressing said actuating button in response to said signal from said control means.

10. The structure of claim 9 wherein said depressing means includes a pivotally mounted trigger member having one end positioned adjacent said actuating button and an electrical solenoid operatively engaged with said trigger member for pivoting said trigger member into engagement with said actuating button, said control means includes an electrical switch for periodically delivering an electrical impulse to said solenoid.

11. A device for assembling parquet flooring tiles from a plurality of substantially identical planar juxtaposed wooden slats having two substantially parallel edges comprising a frame forming a substantially straight slot, conveyor means positioned in said slot including a plurality of sprockets rotatably mounted on said frame, a plurality of spaced apart endless chains encircling said sprockets providing at least one set of transversely aligned pusher means for engaging said wooden slats whereby said conveyor means may transport a plurality of said wooden slats from an input station to a securing station, means on both sides of said slot in said frame aligned with said edges of said wooden slats, said aligning means including a pair of converging elongated upstanding members straddling said conveyor means providing a slat discharging portion, at least one stapling means positioned on said frame at said slat discharging portion of said aligning means providing a stapler head including a staple dispensing slot located adjacent said conveyor means for forcibly delivering a single staple at preselected times into said edges of at least two juxtaposed wooden slats, and control means on said frame periodically operatively engaged with said conveyor means for sensing the condition when a pair of juxtaposed wooden slats are positioned adjacent said staple dispensing slot and operatively engaged with said stapling means for actuating said stapling means when said condition occurs.

12. The structure of claim 9 including a plank secured to said frame at said input station between said endless chains substantially planar with said chains, said pusher mean extending above said plank whereby a plurality of wooden slats may be sequentially positioned at said input station and moved therefrom as a unit by said pusher means.

References Cited
UNITED STATES PATENTS

| | | | |
|---|---|---|---|
| 1,944,493 | 1/1934 | Colbie | 227—3 |
| 2,829,372 | 4/1958 | Lojewski | 227—3 |

GRANVILLE Y. CUSTER, Jr., *Primary Examiner.*

FRANK L. ABBOTT, *Examiner.*

M. O. WARNECKE, *Assistant Examiner.*